US010425337B2

(12) United States Patent
Huang et al.

(10) Patent No.: US 10,425,337 B2
(45) Date of Patent: Sep. 24, 2019

(54) METHOD FOR PROCESSING DOWNLINK SIGNALLING OF SDN VIRTUALIZATION PLATFORM BASED ON OPENFLOW

(71) Applicant: Beijing University of Posts and Telecommunications, Haidian District, Beijing (CN)

(72) Inventors: Tao Huang, Haidian District (CN); Jiannan Zhang, Haidian District (CN); Jiang Liu, Haidian District (CN); Liang Wei, Haidian District (CN); Jian Ding, Haidian District (CN); Yunjie Liu, Haidian District (CN)

(73) Assignee: BEIJING UNIVERSITY OF POSTS AND TELECOMMUNICATIONS, Haidian District, Beijing (CN)

( * ) Notice: Subject to any disclaimer, the term of this patent is extended or adjusted under 35 U.S.C. 154(b) by 562 days.

(21) Appl. No.: 15/039,567

(22) PCT Filed: Sep. 30, 2014

(86) PCT No.: PCT/CN2014/087896
§ 371 (c)(1),
(2) Date: May 12, 2017

(87) PCT Pub. No.: WO2015/078233
PCT Pub. Date: Jun. 4, 2015

(65) Prior Publication Data
US 2017/0250913 A1   Aug. 31, 2017

(30) Foreign Application Priority Data

Nov. 27, 2013 (CN) .......................... 2013 1 0636540

(51) Int. Cl.
*H04L 12/801* (2013.01)
*H04L 12/701* (2013.01)
*H04L 12/721* (2013.01)

(52) U.S. Cl.
CPC .............. *H04L 47/12* (2013.01); *H04L 45/00* (2013.01); *H04L 45/32* (2013.01)

(58) Field of Classification Search
None
See application file for complete search history.

(56) References Cited

U.S. PATENT DOCUMENTS

2016/0269287 A1* 9/2016 Li ........................ H04L 49/3009

FOREIGN PATENT DOCUMENTS

| CN | 102685006 A | 9/2012 |
|---|---|---|
| CN | 102710432 A | 10/2012 |

(Continued)

OTHER PUBLICATIONS

International Search Report to corresponding Int'l Pat. Appl. No. PCT/CN2014/087896, dated Jan. 5, 2015, 4 pages.

*Primary Examiner* — Robert M Morlan
(74) *Attorney, Agent, or Firm* — Tarolli, Sundheim, Covell & Tummino LLP

(57) ABSTRACT

Disclosed is a method for processing downlink signalling of an SDN virtualization platform based on OpenFlow. The method comprises: after the preprocessing of downlink signalling is executed, further executing same, so as to judge whether more Match items also exist in a Match item list; if it is judged that more Match items also exist, acquiring an item from the Match item list; if it is judged that there are no more Match items, ending the processing; after completing the step of acquiring an item from the Match item list if it is judged that more Match items also exist, further judging whether more Action items also exist; if there are no more (Continued)

Action items, combining a new Action item list with the Match items to generate downlink signalling, and issuing same to a virtual network switch; and returning to the step to continue judging whether more Match items also exist; and if more Action items also exist, acquiring the next Action item.

14 Claims, 7 Drawing Sheets

(56) References Cited

FOREIGN PATENT DOCUMENTS

| | | |
|---|---|---|
| CN | 103166876 A | 6/2013 |
| CN | 103595647 A | 2/2014 |
| WO | 2012120465 A1 | 9/2012 |

\* cited by examiner

METHOD FOR PROCESSING DOWNLINK SIGNALLING OF SDN VIRTUALIZATION PLATFORM BASED ON OPENFLOW

RELATED APPLICATIONS

The present application is a U.S. National Stage under 35 USC 371 patent application, claiming priority to Application No. PCT/CN2014/087896, filed Sep. 30, 2014, which claims priority from CN 201310636540.4, filed Nov. 27, 2013, both of which are incorporated in their entirety hereby by reference.

TECHNICAL FIELD

The present invention belongs to technical field of computer network, and in particular relates to a method for processing downlink signallings of SDN virtualization platform based on OpenFlow.

BACKGROUND ART

With rapid development of internet technologies, the numbers of internet applications and users have increased sharply, and many problems and drawbacks with the TCP/IP-based internet have gradually appeared. Many countries have proposed plans for the next generation Internet, giving rise to software defined networks.

An OpenFlow software defined network consists of two parts: a data plane, for forwarding network data packets; and a control plane, for controlling strategies for the forwarding network data packets. Inside an OpenFlow switch of the data plane, a forwarding list, called a list describing virtual network flow rules, is maintained. This list describing virtual network flow rules can be matched based on the properties of Layer 1 (a physical layer) to Layer 4 (a transport layer) of the header of a data packet, and designate a method for processing data packets that match the items of the list describing virtual network flow rules. When a data packet has entered the OpenFlow switch, the OpenFlow switch will look up a list describing virtual network flow rules inside, and process the data packet according to the list describing virtual network flow rules. If there is no list describing virtual network flow rules inside the OpenFlow switch that can match the data packet, the OpenFlow switch will forward the data packet to an OpenFlow controller of the control plane, and the OpenFlow controller will then issue a list describing virtual network flow rules to the OpenFlow switch, for instructing the OpenFlow switch on how to process the data packet. The communication between the OpenFlow controller and the OpenFlow switch follows the OpenFlow protocol. The OpenFlow protocol defines uplink (from the OpenFlow switch to the OpenFlow controller) signallings and downlink (from the OpenFlow controller to the OpenFlow switch) signallings.

If an OpenFlow network is in the control of a plurality of OpenFlow controllers, each OpenFlow controller controls only a portion of specific data packets within the network. In this way, each OpenFlow controller controls a virtual network. However, in OpenFlow 1.0, each OpenFlow switch can have only one control logic, and therefore, data packets with different properties cannot be given to different OpenFlow controllers for processing. For this reason, it is necessary to add a network virtualization layer between an OpenFlow switch and an OpenFlow controller. This network virtualization layer receives the uplink signallings of all OpenFlow switches and, based on the properties of the uplink signallings, forwards them to corresponding OpenFlow controllers for processing. In the same way, the network virtualization layer also needs to process the downlink signallings issued by the OpenFlow controllers, and, after the processing, forward them to corresponding OpenFlow switches.

The specific implementation process of the network virtualization layer is as follows: a network virtualization platform sets up, for the network, a plurality of Slices that correspond to a plurality of virtual networks, assigns an OpenFlow controller to each Slice, and forwards data packets belonging to different Slices to corresponding OpenFlow controllers so as to realize network virtualization; and then adds a FlowSpace into each Slice. A FlowSpace describes the properties of the data packets forwarded to a Slice, at least including one or more of a plurality of the following Match items: a switch port (layer 1), source mac/destination mac or type of Ethernet (layer 2), source IP/destination IP or type of protocol (layer 3), and a TCP/UDP source port/destination port (layer 4); a PacketIn signalling is sent to the network virtualization platform after a network data packet enters an OpenFlow switch, the network virtualization platform matches the PacketIn signalling with the Match items in the FlowSpaces, if the PacketIn signalling matches a flow rule in a FlowSpace, then this PacketIn message is forwarded to the OpenFlow controller in which that FlowSpace is located.

The following drawbacks exist in the prior art:

1) The network virtualization platform conducts virtual network division based on each switch, each time a data packet enters an OpenFlow switch and a PacketIn is generated, the network virtualization platform will match the data packet with all FlowSpaces to determine which virtual network the data packet belongs to, after the data packet leaves the current switch and enters the next switch, the network virtualization platform will still match the data packet with all FlowSpaces to determine which virtual network the data packet belongs to. Thus, a virtual network determination is made for each hop. The efficiency is low.

2) The OpenFlow protocol allows a switch to perform flexible modification operations on data packets. After a data packet is operated on by a virtual network, part of the fields of the data packet may be modified. After this data packet enters another OpenFlow switch, it may be determined by the network virtualization platform as a data packet of another virtual network, which results in one data packet being controlled by the different OpenFlow controllers that correspond to the virtual networks. Data packet isolation is poor.

3) Although the network virtualization platform checks and modifies the Match items of lists describing the virtual network flow rules issued by the OpenFlow controllers that correspond to the virtual networks, it does not check the mutual exclusivity of the FlowSpaces, which causes that the lists describing virtual network flow rules issued by the OpenFlow controller that corresponds to virtual network 1 may match data packets that correspond to virtual network 2, resulting in signallings crossing the boundaries.

4) The network virtualization platform does not define physical extent of the virtual networks, which will lead to free propagation of virtual network data packets. The data packets do not have closure.

SUMMARY

To overcome the aforementioned disadvantages of the prior art, the present invention provides a method for preprocessing downlink signallings of a SDN virtualization platform based on OpenFlow, characterized in that:

receiving, by a network virtualization platform, a downlink signalling issued by an OpenFlow controller;

adding a first Match item that matches with a virtual network flow tag into a specific field of the downlink signalling, so that the specific field matches with data packets within a virtual network;

adding the first Match item into a list of Match items;

adding a second Match item, which is a Match item that matches with no tag, into a specific field of the downlink signalling, the second Match item matches with data packets that enter the virtual network from edge of the virtual network;

performing a union operation on the second Match item and each flow of virtual network flow rules, and adding the Match item after the operation into the list of Match items;

obtaining the list of Match items.

Preferably, said virtual network controller is an OpenFlow controller; said downlink signalling is FlowMod; said specific field is the Match field in the downlink signalling FlowMod; said list of Match items is the equivalent list of Match items of the Match fields of the downlink signalling FlowMod in the virtual network.

Preferably, the method comprises checking whether a list of specific field contains an indicator for FLOOD operation; if the list of specific field does not contain an indicator for FLOOD operation, generating a corresponding field for each Match item in the list of Match items, issuing a flow rule, and ending the pre-processing process; if the list of specific field contains an indicator for FLOOD operation, it means that FLOOD operation is included; obtaining all ports of virtual switches in the virtual network, and checking whether there are more ports; if it is determined that there are more ports, then obtaining one port; checking whether the port is an edge port of the virtual network; if it is determined that the port is an edge port of the virtual network, performing a union operation on the port and all Match items without tag in the list of Match items, and adding obtained new Match items into a new list of Match items.

Preferably, if it is determined that the port is not an edge port of the virtual network, it needs to check further whether the port is an internal port of the virtual network.

Preferably, if it is determined that the port is not an internal port of the virtual network, then it needs to return to the step of checking whether there are more ports.

Preferably, if it is determined that the port is an internal port of the virtual network, it needs to perform a union operation on the port and all Match items with Slice tag in the list of Match items, and add obtained new Match items into a new list of Match items.

Preferably, if the result of the step of checking whether there are more ports is negative, it needs to generate a corresponding field for each Match item in the list of Match items, issue a flow rule, and end the pre-processing process.

Preferably, said specific field is the Action field, said Action field belonging to the FlowMod signalling.

The present invention also concerns a method for processing downlink signalling of a SDN virtualization platform based on an OpenFlow, characterized in that:

after performing the pre-processing of a downlink signalling, the following is further performed:

determining whether there are more Match items in the list of Match items;

if it is determined that there are more Match items, obtaining an item from the list of Match items;

otherwise, ending the processing;

after obtaining an item from the list of Match items when it is determined that there are more Match items, further determining whether there are more Action items;

if there are no more Action item, combining the new list of Action items with the Match items to generate a downlink signalling, issuing the downlink signalling to an OpenFlow switch, and returning to determine whether there are more Match items;

if there are more Action items, obtaining the next Action item.

Preferably, the method further comprises: after the step of obtaining the next Action item, further determining whether type of the Action item is output type; if the type of the Action item is not output type, adding that Action item into a new list of Action items, and returning to the step of determining whether there are more Action items; if the type of the Action item is output type, further checking whether parameter of the output type is equal to an indicator for FLOOD operation; if the result of checking whether parameter of the output type is equal to an indicator for FLOOD operation is negative, further performing the following steps: if state of a flow tag needs to be adjusted, adding a specific Action item into the new list of Action items, adding output type being equal to a port to the new list of Action items, and returning to the step of determining whether there are more Action items; if the result of checking whether parameter of the output type is equal to an indicator for FLOOD operation is positive, further obtaining all other ports in the virtual network other than input ports in Match items.

Preferably, after the step of obtaining all ports in the virtual network other than the input port in the Match item, the following steps is further performed: for each port, if a flow tag needs to be adjusted, adding the specific Action item into the new list of Action items, adding output type being a port into the new list of Action items, and returning to the step of determining whether there are more Action items.

Preferably, said downlink signalling is a FlowMod message, and said specific Action item is a ModVlan Action.

The present invention also provides a method for processing downlink signalling of a SDN virtualization platform based on OpenFlow, characterized in that:

obtaining a specific field of a downlink signalling;

determining whether there are more Action items;

if there are no more Action item, issuing the downlink signalling, and ending the processing;

if there are more Action items, obtaining the next Action item;

after the step of obtaining the next Action item, further performing the following steps:

determining whether type of the Action item is output;

if the type of the Action item is not output, adding that Action item into an list of Action items, and returning to the step of determining whether there are more Action items;

if the type of the Action item is output, further checking whether that Action item contains an indicator for FLOOD operation;

if the result of checking whether the Action item contains an indicator for FLOOD operation is negative, and if state of a flow tag needs to be adjusted, adding a specific Action item into a new list of Action items, adding output type being equal to a port to the new list of Action items, and returning to the step of determining whether there are more Action items;

if the result of checking whether the Action item contains an indicator for FLOOD operation is positive, determining whether BufferID of the downlink signalling is equal to −1;

if the BufferId is equal to −1, obtaining all ports of the virtual network switch in a virtual network; for each port, if the state of the flow tag needs to be adjusted, adding the specific Action item into a new list of Action items, adding output type being equal to a port to the new list of Action items, and returning to the step of determining whether there are more Action items;

if the BufferId is not equal to −1, obtaining all other ports of the virtual network switch in the virtual network other than input port of data packet to which the BufferId corresponds; for each port, if the state of the flow tag needs to be adjusted, adding the specific Action item into a new list of Action items, adding output type being equal to a port to the new list of Action items, and returning to the step of determining whether there are more Action items.

Preferably, said downlink signalling is a PacketOut signalling; said specific Action item is a ModVlan Action.

The above description is merely a general description of the technical solutions of the present invention. In order to be able to understand more clearly the technical means of the present invention and to implement it according to the contents of the specification, preferred embodiments of the present invention are described in detail below in connection with the accompanying figures as follows.

DETAILED DESCRIPTION OF THE INVENTION

In order to further explain the technical means adopted by the present invention to achieve the preset inventive goals as well as the resulting effects, in connection with the accompanying figures and preferred embodiments, the particular implementations, characteristics, and effects of the method for processing a downlink signalling on an OpenFlow protocol-based network virtualization platform proposed by the present invention are described in detail below as follows. In the following description, the different "an embodiment" or "embodiments" does not necessarily mean the same embodiment. In addition, specific characteristics, structures or features in one or more embodiments can be combined in any appropriate form.

Figure 1:
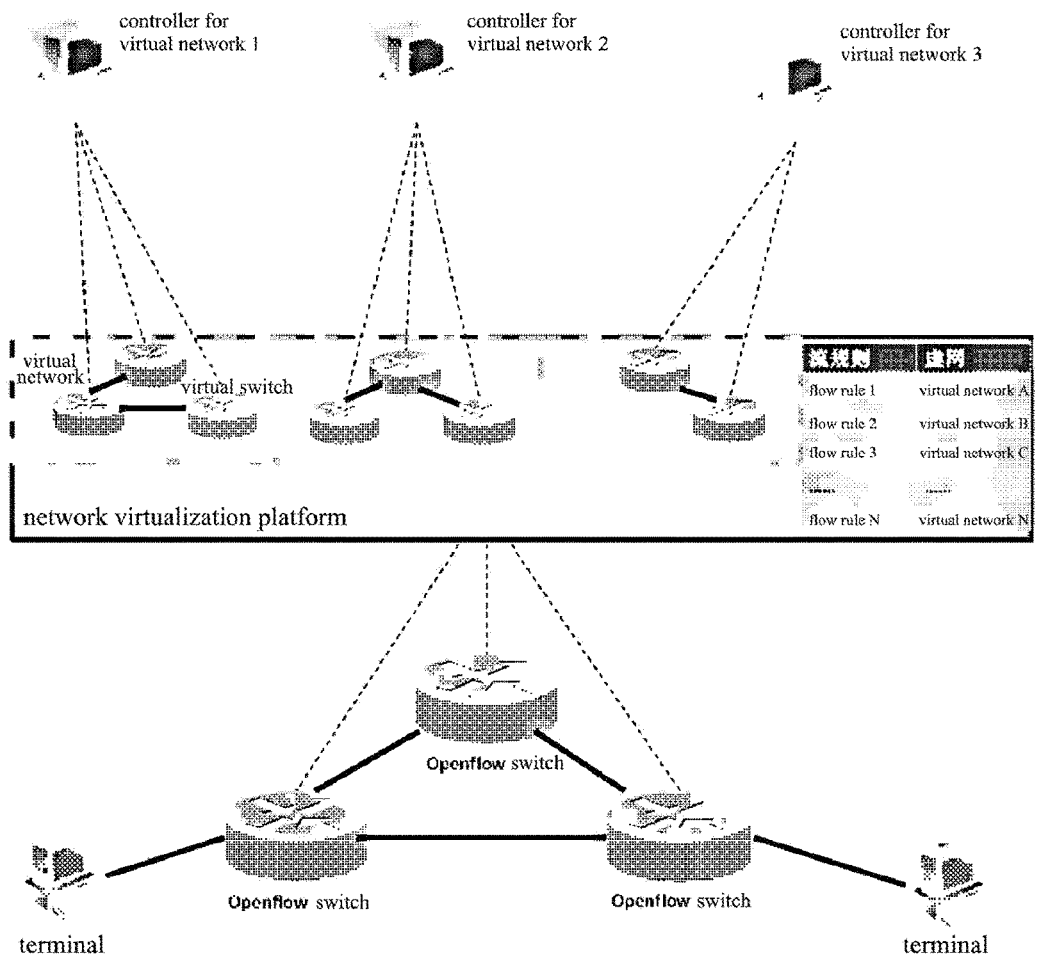
FIG. 1 shows a network structure diagram according to an embodiment of the present invention.

FIG. 1 shows a network structure diagram according to an embodiment of the present invention, in which the topology of virtual networks is maintained within a network virtualization platform, the switches within the virtual networks being virtual network switches. The OpenFlow switches are physical switches within the network. The virtualization platform generates a plurality of virtual networks according to user configuration, and each virtual network is connected respectively to a corresponding virtual network controller. For a physical switch, the virtualization platform is equivalent to a controller of that physical switch.

Within the network virtualization platform, a list describing virtual network flow rules is maintained. When a physical switch receives a data packet, if the physical switch has no flow list that matches the data packet, then the data packet is encapsulated into a PacketIn signalling and sent to the network virtualization platform. The network virtualization platform determines to which virtual network the data packet should be given for processing based on the properties of the data packet in the PacketIn signalling. If the data in the PacketIn signalling contains a virtual network flow tag, then, after the virtual network flow tag is popped, the data is sent to a corresponding virtual network controller based on the virtual network flow tag; if no virtual network flow tag is contained, then the data packet in the PacketIn signalling is matched with the list describing virtual network flow rules, and the data packet is given to the virtual network indicated by the Match items for processing.

Figure 2:
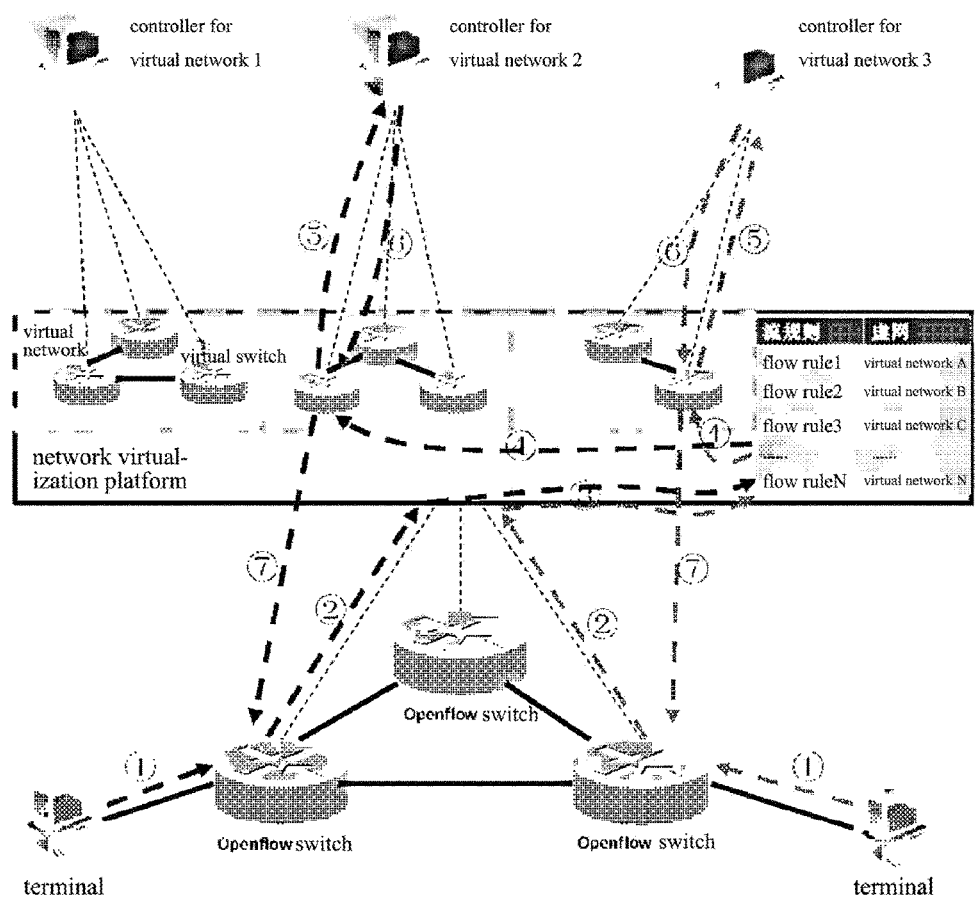
FIG. 2 shows an illustrative diagram of data packet flows according to an embodiment of the present invention.

FIG. 2 shows an illustrative diagram of data packet flows according to an embodiment of the present invention.

① represents that the data packet is sent from a terminal to an OpenFlow switch;

② represents that after receipt of the data packet, if the physical switch (i.e., the OpenFlow switch) has no corresponding flow list, the physical switch encapsulates the data packet into a PacketIn signalling and sends it to the virtualization platform;

③ represents that the network virtualization platform determines whether the data packet contains a virtual network flow tag;

④ represents that if it is determined that the data packet does not contain a virtual network flow tag, then it is necessary to determine to which virtual network the data packet is sent according to the list of virtual network flow rules;

⑤ represents that the PacketIn signalling is sent via a virtual network switch within a virtual network to a virtual network controller;

⑥ represents that the virtual network controller sends a downlink signalling (FlowMod or PacketOut) to the virtual network switch;

⑦ represents that the network virtualization platform, after having processed the downlink signalling, sends the processed downlink signalling to the physical switch.

In a particular implementation of the present invention, two lists are maintained within a network virtualization platform: one is a list describing virtual network physical extents, and the other is the list describing virtual network flow rules. When setting up virtual networks, the topology of the virtual networks is established according to a list describing virtual network physical extents. During the operation of virtual networks, data packets in the physical network are given to virtual network controllers that correspond to the virtual networks for processing according to virtual network flow rules.

Said list describing virtual network physical extents is used for describing the virtual topology of the virtual networks, its structure being as follows:

List 1: A List Describing Virtual Network Physical Extents

| DPID | OFPort |
|---|---|
| DPID1 | OFPort1 |
| DPID2 | OFPort2 |
| ... | ... |

Wherein, DPID is a 64-bit identifier used for identifying an OF (OpenFlow) switch; OFPort is a 16-bit identifier used for identifying a port within an OF switch.

A port within the network can be uniquely determined by the 2-tuple of DPID and OFPort. The list describing virtual network physical extents can comprehensively describe the physical resources used by a virtual network.

Said list describing virtual network flow rules is used for describing virtual network data packets, its structure being as follows:

List 2: List Describing Virtual Network Flow Rules Rule

| dpid | inport | ether source | ether dst | ether type | IP src/ mask | IP dst/ mask | IP proto | IP TOS bits | TCP/UDP src port | TCP/UDP dst port |
|---|---|---|---|---|---|---|---|---|---|---|

When the physical extents of a plurality of virtual networks overlap, if a data packet is generated from an overlapping area of the virtual networks, the data packet will be given to a virtual network thereof for processing according to the list describing virtual network flow rules.

Flow rules are description of data packets, and can describe the header properties of a data packet from Layer 1 to Layer 4. Flow rules include the following 11 Match items, and therefore are called 11-tuple, wherein the meanings of various Match items being as follows:

List 3: Match items of Virtual Network Flow Rules

| dpid | OF switch ID |
|---|---|
| inport | inport of a data packet |
| ether source | Ethernet source MAC address |
| ether dst | Ethernet destination MAC address |
| ether type | Ethernet Type |
| IP src/mask | Source IP address, mask for global |
| IP dst/mask | Destination IP address, mask for global |
| IP proto | IP protocol segment |
| IP TOS bits | IP packet TOS segment |
| TCP/UDP src port | TCP/UDP source port number |
| TCP/UDP dst port | TCP/UDP destination port number |

Each Match item in List 3 contains three segments, i.e.: the Match field, the Match type, and the Match parameter, wherein the Match field is one of the 11-tuple in List 3, and is a Match segment used for identifying the Match item; the Match type is used for identifying the matching mode of the Match field, and has three values: ignore, equal, other; the Match parameter is used for identifying the matching data parameter of the Match field.

Thus, a complete flow rule should contain the following information:

List 4: Structure of Flow Rules

| Match field | Match type | Match parameter |
|---|---|---|
| dpid | enum{ignore,equal,other} | xxx |
| inport | enum{ignore,equal,other} | xxx |
| ether source | enum{ignore,equal,other} | xxx |
| ether dst | enum{ignore,equal,other} | xxx |
| ether type | enum{ignore,equal,other} | xxx |
| IP src | enum{ignore,equal,other} | xxx |
| IP dst | enum{ignore,equal,other} | xxx |
| IP proto | enum{ignore,equal,other} | xxx |
| IP TOS bits | enum{ignore,equal,other} | xxx |
| TCP/UDP src port | enum{ignore,equal,other} | xxx |
| TCP/UDP dst port | enum{ignore,equal,other} | xxx |

There are three types of flow rule Match type in total, i.e., ignore, equal, and other, representing respectively:

ignore: ignore matching of this Match item;

equal: match when a data packet is equal to the Match parameter of this Match field;

other: find the other flow rules of which the Match type with this Match field is equal, if those flow rules do not match, then match this item.

For example, three flow rules that have been set up are as follows:

Flow Rule 1: Match field: inport, Match type: equal, Match parameter: 1;

Flow Rule 2: Match field: inport, Match type: equal, Match parameter: 2;

Flow Rule 3: Match field: inport, Match type: other, Match parameter: null.

If the inport of a data packet=1, then this data packet matches Flow Rule 1; if the inport of the data packet=2, then this data packet matches Flow Rule 2; if the inport of the data packet=3, then this data packet matches neither Flow Rule 1 nor Flow rule 2, and therefore matches Flow Rule 3.

In a particular implementation of the present invention, after a physical switch (an OpenFlow switch) is connected to a network virtualization platform, the network virtualization platform will look up the list describing virtual network physical extents of all virtual networks that have been initiated. If the newly linked physical switch is in the list describing virtual network physical extents, then it is added into the virtual topology of the virtual networks.

The network virtualization platform is responsible for detecting and maintaining the physical network's link information. When the network virtualization platform has discovered a physical link and the list describing virtual network physical extents contains the ports at the two ends of this physical link, this physical link is added into the virtual topology of the virtual networks.

In a particular implementation of the present invention, after topology of a virtual network has been established, virtual network flow rules are to be added for the virtual network so that data packets that match the flow rules will be processed by the OpenFlow controllers that correspond to the virtual network. Each time when a virtual switch is added into the virtual network, the items associated with that virtual switch will be taken out of a list describing virtual network flow rules in the database and added into the virtual network flow rules.

There are two paths after a data packet has been processed by an OpenFlow controller that corresponds to a virtual network: being forwarded out from the edge of the virtual network; or, being forwarded to another virtual network node. Because the operations performed by the OpenFlow controller on data packets are not limited to the forwarding operation, the OpenFlow controller may also have modified the header information of the data packets, and the modified header information may not match the virtual network flow rules of the current virtual network, possibly resulting in a data packet forwarded from a virtual network node to another virtual network node being processed by different OpenFlow controllers or being dropped. To resolve this problem, the present invention proposes a mechanism for tagging virtual network data packets. When a data packet is transmitted within the virtual network topology, the data packet must carry a unique virtual network flow tag. In this way, no matter how the header of this data packet has been modified, it will be processed by the correct OpenFlow controller that corresponds to the virtual network.

In a particular implementation of the present invention, the ports of the switch of each virtual network are classified into three types: internal ports of the virtual network, edge ports of the virtual network, and inhibited ports of the virtual network. The internal ports of a virtual network are the ports within the topology of the virtual network that are connected to links, the edge ports of a virtual network are the ports within the topology of the virtual network that do not link to links, and the inhibited ports of a virtual network are the ports within the topology of the virtual network that are closed. In a particular implementation of the present invention, instructions issued by the OpenFlow controller that corresponds to a virtual network are detected. If the OpenFlow controller forwards a data packet out from an internal port of the virtual network, then the Action field in the OpenFlow downlink signalling (PacketOut/FlowMod) is modified, with a Tag Action being added to an appropriated location, ensuring that data packets sent from the internal ports of the virtual network contain a virtual network flow tag. For the same reason, to ensure that data packets sent from the edge ports of the virtual network do not contain a virtual network flow tag, it is necessary to add an Pop Tag Action to an appropriate location in the Action field, ensuring that no uplink signalling are generated from the inhibited ports of the virtual network and the forwarding operations of downlink signallings on the inhibited ports are also invalid. The virtual network flow tag can be a vlan tag, a mpls tag, or a tag of another type. The virtual network flow tag in the present embodiment is a vlan tag.

In the present application, data packets mean the data flow of the data plane in a software defined network. When a data packet arrives at an OpenFlow switch but the OpenFlow switch is unable to process this data packet, the OpenFlow switch will encapsulate the data packet into the OpenFlow protocol and send it to a corresponding controller. Openflow protocol data packets are called signallings.

The PacketIn signalling is the prevailing uplink signalling in OpenFlow. When a data packet has arrived at an OpenFlow switch (a physical switch), the OpenFlow switch will look up a flow list to process the data packet. If there is no item in the flow list of the OpenFlow switch that matches the data packet, then the switch submits the data packet to the network virtualization platform for processing via the PacketIn signalling. If there is an item in the flow list of the OpenFlow switch (a flow list item) that matches the data packet, then the physical switch processes the data packet according to the Action item assigned by the flow list item. The network virtualization platform first receives the PacketIn data packet, and it needs to decide how to process and how to forward this PacketIn.

Figure 3:
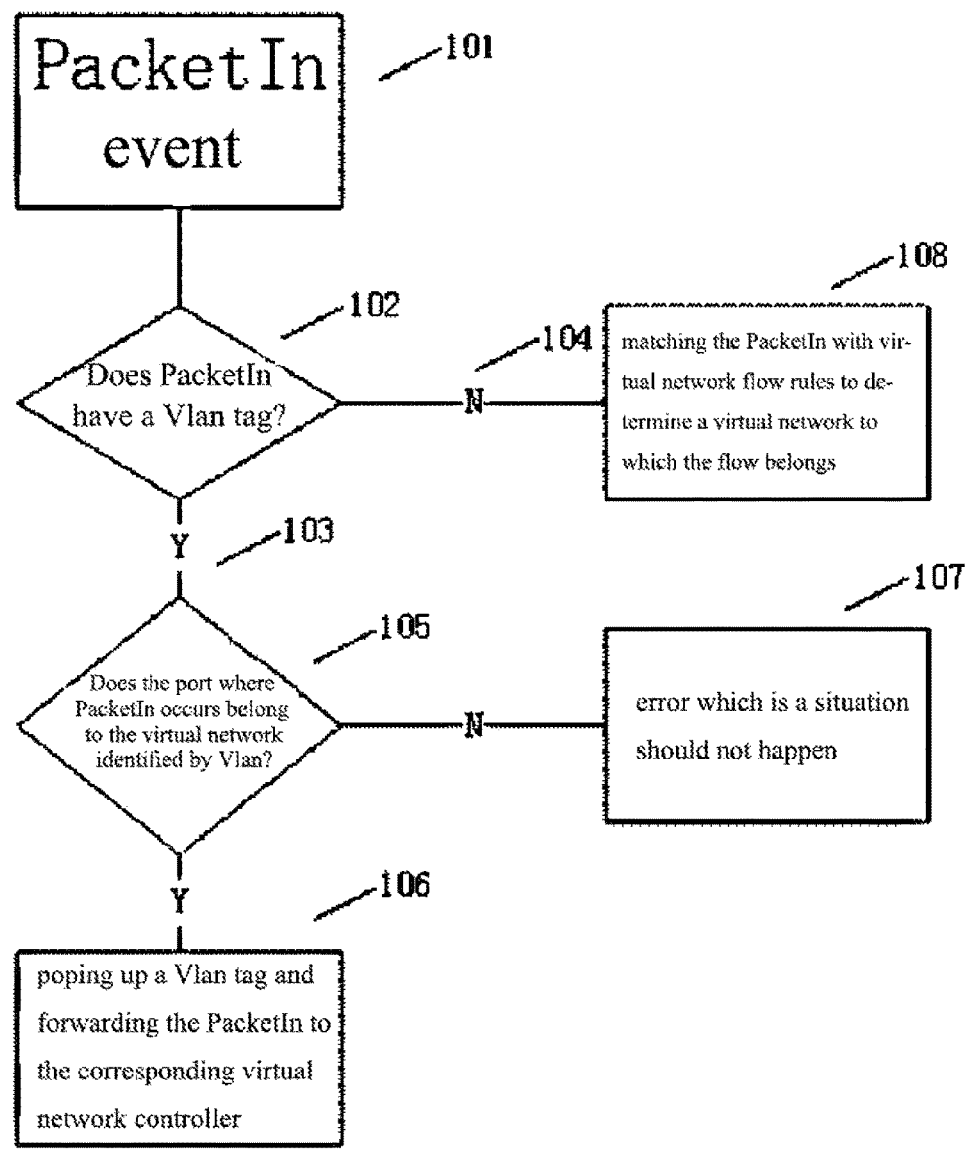
FIG. 3 shows the process of processing a PacketIn signalling according to an embodiment of the present invention.

The PacketIn message received by the network virtualization platform contains the following information:

1. The DPID of the OpenFlow switch that generated the packetIn;
2. The input port of the OpenFlow switch of the data packet;
3. The header of the data packet (128 byte by default);

Refer to the process of processing a PacketIn signalling in FIG. 3. Step 101, the network virtualization platform receives a PacketIn message; Step 102, determine whether the message carries a Vlan tag; Step 103, if the data packet carries a Vlan tag, then it means that the data packet is a data packet within a virtual network; Step 105, determine whether the location where the PacketIn was generated is within the physical extent defined by the virtual network, possibly by determining whether the port receiving the PacketIn belongs to the virtual network identified by the Vlan; Step 106, if so, pop the Vlan tag of the data packet, and then forward the data packet to the corresponding OpenFlow controller that corresponds to the virtual network; Step 107, otherwise, report an error; Step 104, if the data packet does not carry a Vlan tag, then it means that the data packet is an unsorted data packet; Step 108, need to match the header of the data packet with the virtual network flow rules of each virtual network, and forward the PacketIn to the OpenFlow controller that corresponds to the matching virtual network.

The PacketOut signalling and the FlowMod signalling are the prevailing downlink signallings in OpenFlow. For downlink signallings, it mainly needs to perform the following processes:

1. Process the Match field of downlink signallings, to prevent the Match field of the flow list issued by a virtual network controller from matching with data packets that do not belong to the virtual network flow rules, so as to ensure that the control information issued by the OpenFlow controller that corresponds to the virtual network is under the constraints of the virtual network flow rules.

2. Process the Action field of downlink signallings, to, on one hand, ensure that the data packets carry the correct virtual network flow tag when being forwarded in the virtual network, and, on the other hand, control the extent of the propagation of the virtual network data packets, to prevent data packets from propagating outside of the virtual network from a port not defined by the virtual network.

Among downlink signallings, the FlowMod signalling contains the Match field. Below, using the FlowMod signalling as an example, the method for processing the Match field is described, but without excluding its use in other signallings:

The Match field of data packets in the OpenFlow protocol is used to describe how a data packet matches a flow tag. The Match items contained in the OFMatch field are as follows:

in_port; /*Input switch port. */data packet input port
dl_src; /*Ethernet source address. */source mac
dl_dst; /*Ethernet destination address. */destination mac
dl_vlan; /*Input VLAN id. */vlan tag
dl_vlan_pcp; /* Input VLAN priority. */vlan priority
dl_type; /*Ethernet frame type. */Ethernet frame type
nw_tos; /*IP ToS (actually DSCP field, 6 bits). */IP priority nw_proto; /*IP protocol or lower 8 bits of ARP opcode. */IP protocol type or number of operations in ARP packets nw_src; /*IP source address. */IPv4 source address nwd_st; /*IP destination address. */IPv4 destination address tp_src; /*TCP/UDP source port. */TCP/UDP source port tp_dst; /*TCP/UDP destination port. */TCP/UDP destination port An OFMatch contains a plurality of Match items, and the OFMatch can indicate which of the segments need to be matched through masks.

An OFMatch intersection means the common Match segments possessed by two OFMatch items. An OFMatch union means all Match segments processed by two OFMatch items. When the Match segments of two OFMatch items have overlapping items, but the parameters of the overlapping Match items are different, no union exists. A union can be noted as OFMatch1+OFMatch2.

For example: OFMatch1=dl_src+dl_dst+dl_type
OFMatch2=dl_src+nw_src+nw_dst

The intersection between OFMatch1 and OFMatch2 is dl_src.

When the dl_src of OFMatch1 is the same as the dl_src of OFMatch2, there is an union between OFMatch1 and OFMatch2, and the union is dl_src+dl_dst+dl_type+nw_src+nw_dst.

Figure 4:
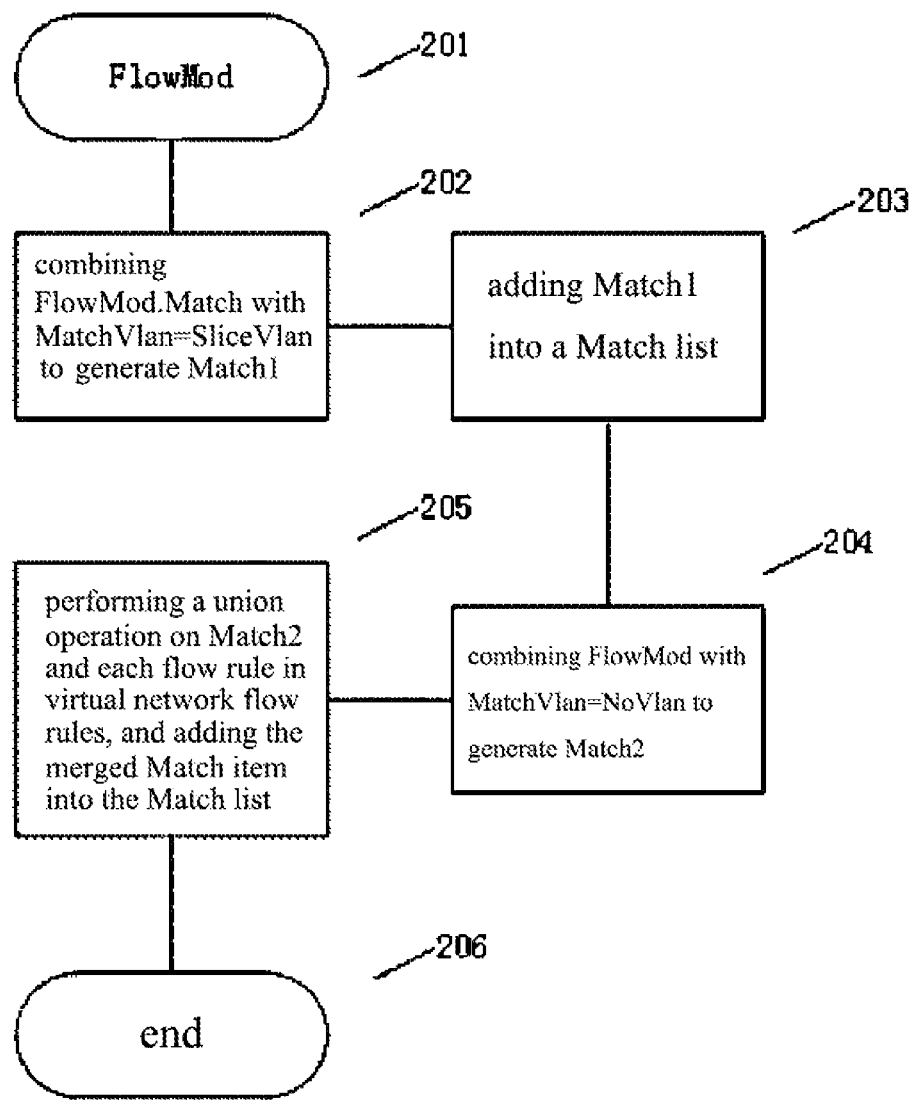
FIG. 4 shows the process of pre-processing a Match field according to an embodiment of the present invention.

FIG. 4 illustrates schematically the process of pre-processing a Match field. Step 201, the network virtualization platform receives a FlowMod downlink signalling issued by an OpenFlow controller; Step 202, add a Match item that matches the virtual network flow tag (SliceVlan) into the Match field in the FlowMod, such that the Match item will match the data package within the virtual network; Step 203, the match being Match1, add it into a list of Match item; Step 204, add a Match item that matches No Tag (NoVlan) into the Match field in the FlowMod, the Match generated being Match2, which will match data packets that enter a virtual network from the edge of the virtual network; Step 205, perform a union (i.e., a union operation) between Match2 and each flow in the virtual network flow rules, and add the Match item after the union operation into the list of Match item; Step 206, the obtained list of Match items ultimately is the equivalent list of Match items of the Match field of the FlowMod in this virtual network, end.

Figure 5:
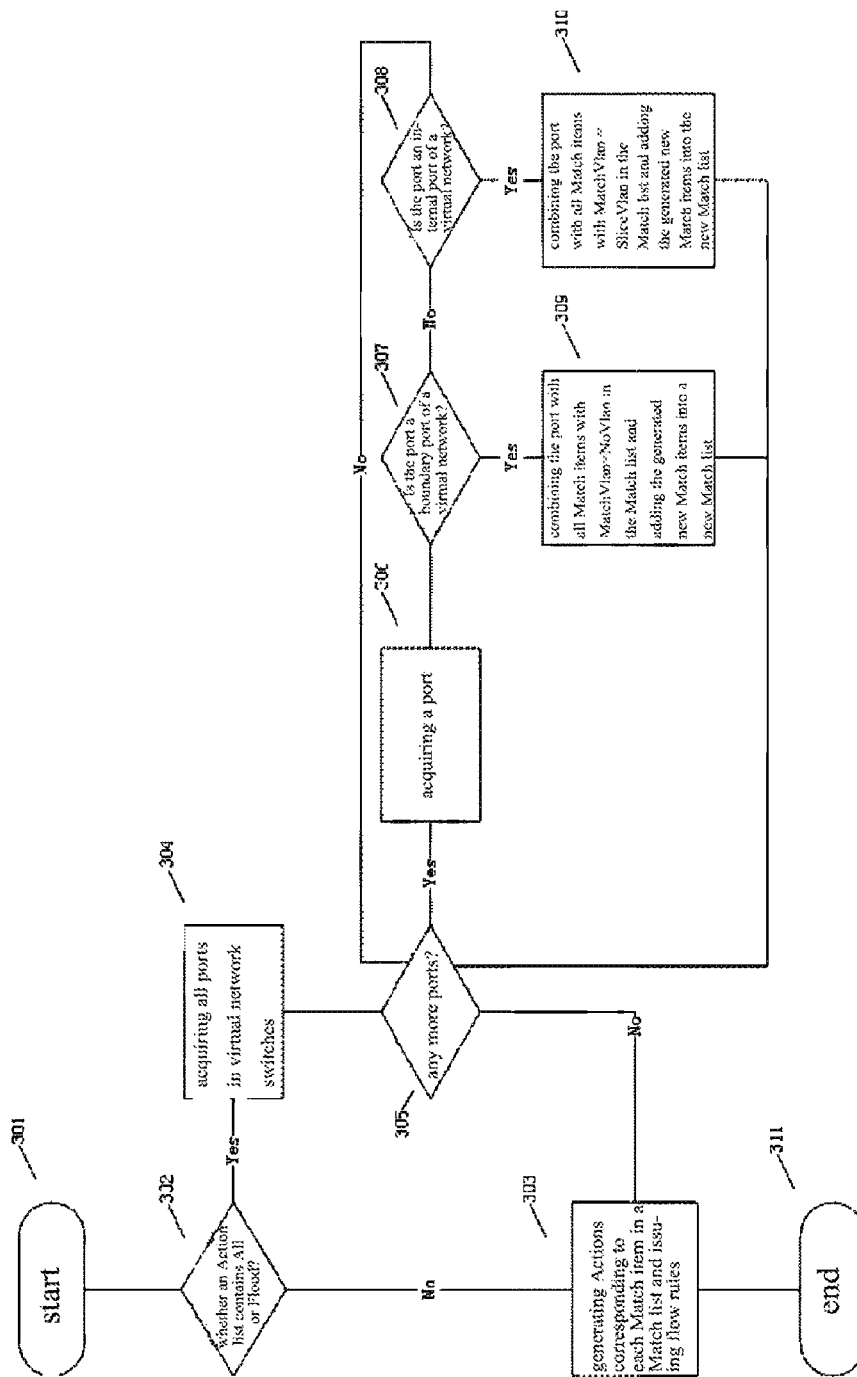
FIG. 5 shows the process of pre-processing an Action field in a FlowMod signalling according to an embodiment of the present invention.

Among downlink signallings, the FlowMod signalling and the PacketOut signalling contain an Action field. FIG. 5 schematically illustrates the process of pre-processing the Action field in the FlowMod signalling. Step 301, start; Step 302, check whether an list of Action item contains All or Flood, with the purpose of pre-checking whether the Action field contains such FLOOD operation with Output=Flood or Output=All, Step 303, if the list of Action items does not contain All or Flood, then for each Match item in the list of Match item, generate a corresponding Action item, issue flow rules, and carry out Step 311; Step 304, if the list of Action item contains All or Flood, then it means that it contains FLOOD operation; Step 305, detect whether there are more ports; Step 306, if it is determined that there are more ports, then obtain a port; Step 307, determine whether the port is a edge port of a virtual network; Step 309, if it is determined that the port is a edge port of a virtual network, then perform a union between the port and all Match items with MatchVlan=NoVlan in the list of Match item, and add the obtained new Match items into a new list of Match item; if in Step 307 it is determined that the port is not a edge port of a virtual network, then Step 308, determine whether the port is an internal port of a virtual network; Step 310, if it is determined that the port is an internal port of a virtual network, then perform a union between the port and all Match items with MatchVlan=SliceVlan in the list of Match item, and add the obtained new Match items into the new list of Match item; if in Step 308 it is determined that the port is not an internal port of a virtual network, then return to Step 305; if in Step 305 it is determined that there are no more ports, then carry out Step 303; Step 311, end.

Figure 6:
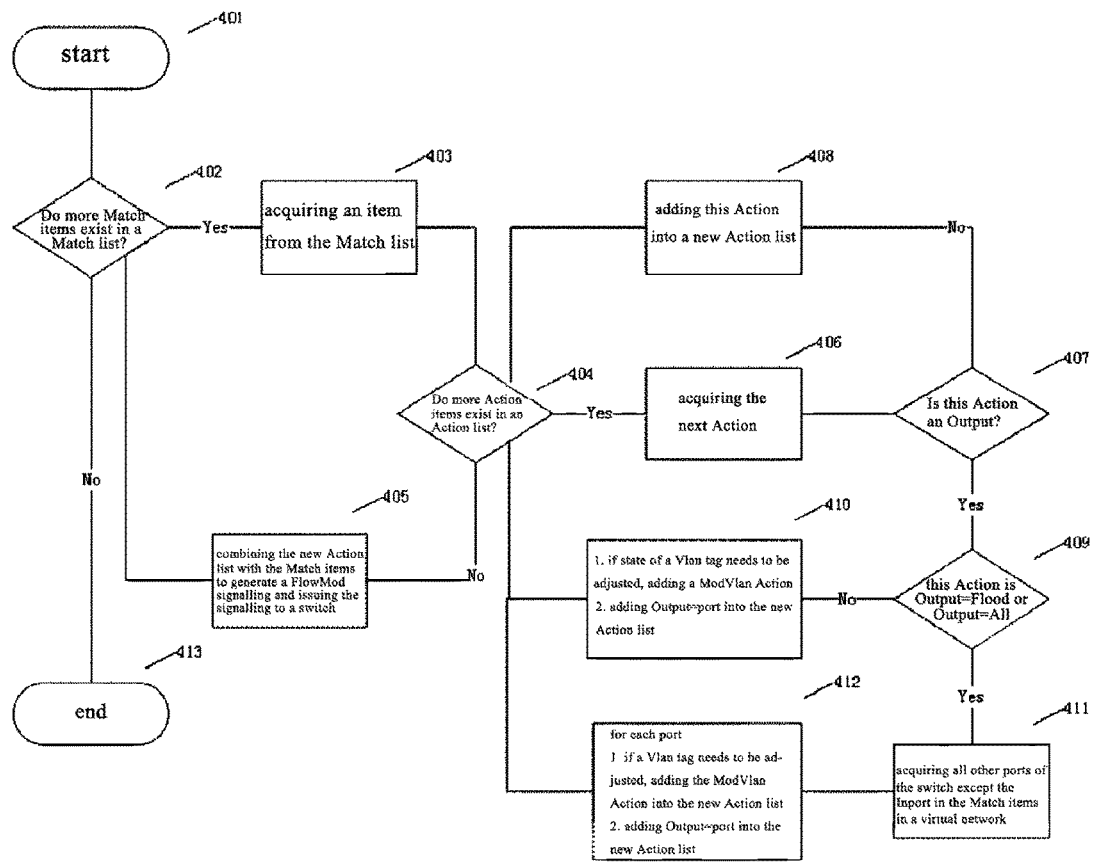
FIG. 6 shows the process of processing an Action field in a FlowMod signalling according to an embodiment of the present invention.

FIG. 6 schematically illustrates the process of processing the Action field in a FlowMod signalling. Before this processing process, the FlowMod signalling has already processed Match items, generated a list of Match item, and for each item in the list of Match item, generated a corresponding Action item corresponding thereto. The Match items and the Action items are combined to generate a FlowMod message, and it is issued to an OpenFlow switch (a physical switch).

Step 401, start; Step 402, determine whether there are more Match items in a list of Match item; if it is determined that there are no more Match items in the list of Match item, then proceed to Step 413; otherwise, Step 403, an item is obtained from the list of Match item; Step 404, determine whether there are more Action items; Step 405, if there are no more Action items, then a new list of Action item and the Match items are combined to generate a FlowMod signalling, and it is issued to an OpenFlow switch (a physical switch), and return to Step 402; if the result determined in Step 404 is positive, then obtain the next Action item in Step 406; Step 407, determine whether the type of the Action item is Output; if it is not Output, then proceed to Step 408, add this Action item directly into a new list of Action item, and return to Step 404; if it is Output, then proceed to Step 409, continue to check whether its parameter Output is equal to flood or all; if the result is negative, then proceed to Step 410, if it is necessary to adjust the state of a Vlan tag, then add ModVlan Action into the new list of Action item, add Output=port into the new list of Action item, and return to Step 404; if the result determined in Step 409 is positive, then proceed to Step 411, the result being positive meaning that the Match fields necessarily contain Inport, take out all virtual network ports other than the Inport in the Match items in a virtual network switch; Step 412, for each port, if it is necessary to adjust the Vlan tag, then add ModVlan Action into the new list of Action item, and add Output=port into the new list of Action item, and return to Step 404; Step 413, end.

Output=flood and Output=All Action are converted into the Output Action for each port. It is necessary to check, before each Output Action, whether the Vlan state of a data packet contains a virtual network flow tag or no tags. A network virtualization platform must make sure that the forwarded data packets contain a proper virtual network tag (Vlan); if Vlan is not proper, then it is necessary to conduct further adjustments.

The method for adjusting a Vlan tag is:

1. Maintaining a state variable VlanState internally to save the current Vlan tag state of a data packet.

2. Checking the MatchVlan in the Match field of FlowMod, if MatchVlan=SliceVlan, then the initial value of VlanState is SliceVlan, if MatchVlan=NoVlan, then VlanState=NoVlan.

3. If Output=a edge port of a virtual network, then check whether VlanState is NoVlan, if it is NoVlan, then add Output directly into a new list of Action item, if it is SliceVlan, then first add ModVlan=NoVlan into an list of Action item, then change VlanState to NoVlan, and add Output into the list of Action item.

4. If Output=an internal port of a virtual network, then check whether VlanState is SliceVlan, if it is SliceVlan, then add Output directly into a new list of Action item, if it is NoVlan, then first add ModVlan=SliceVlan into an list of Action item, then change VlanState to SliceVlan, and add Output into the list of Action item.

Figure 7:
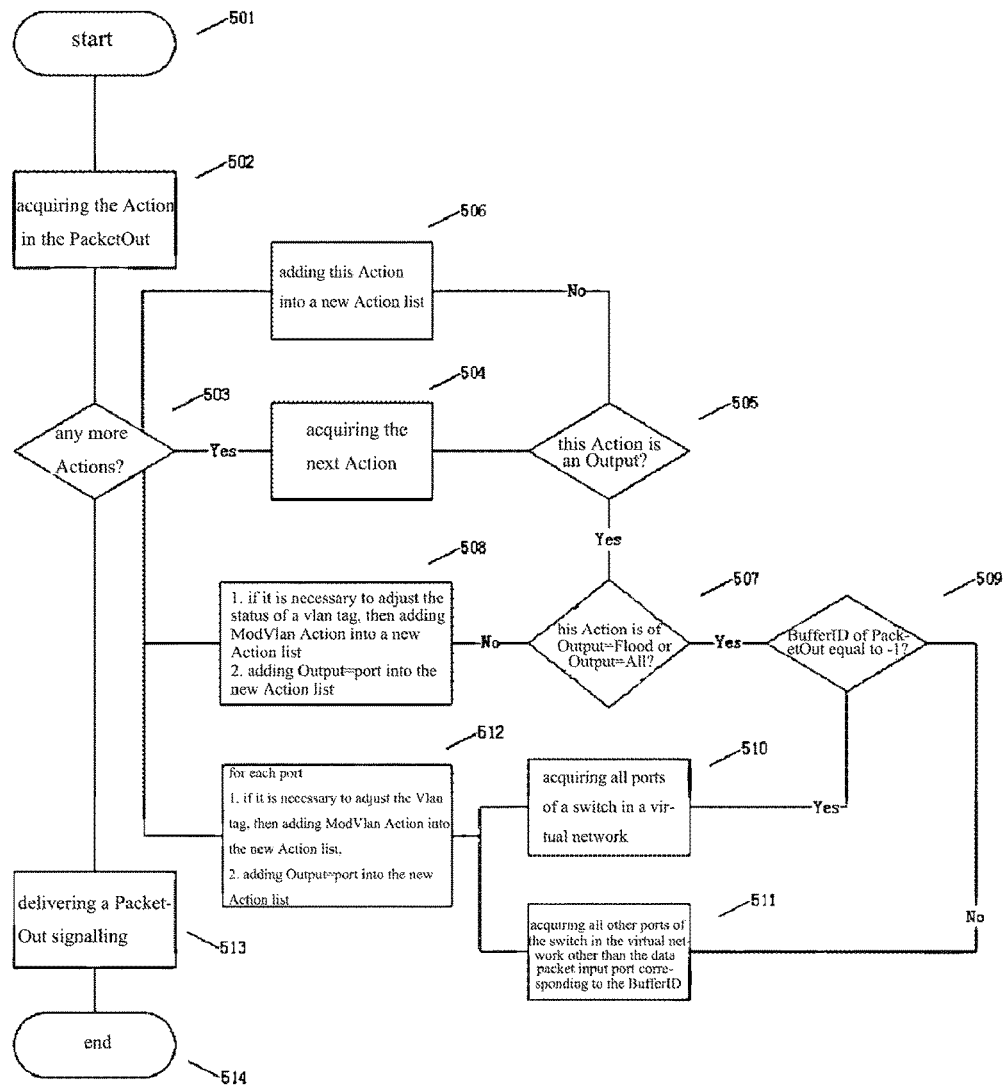
FIG. 7 shows the process of processing an Action field in a PacketOut signalling according to an embodiment of the present invention.

FIG. 7 schematically illustrates the process of processing the Action field in a PacketOut signalling. The PacketOut signalling processes only one specific data packet, and does not have any Match field. Step 501, start; Step 502, obtain the Action field in the PacketOut; Step 503, determine whether there are more Action items; if it is determined that there are no more Action items, then proceed to Step 513, issue a PacketOut signalling, and advance to Step 514; otherwise, Step 504, obtain the next Action item; Step 505, determine whether the type of the Action item is Output; if it is not Output, then proceed to Step 506, add this Action item into an list of Action item, and return to Step 503; if it is Output, then proceed to Step 507, continue to check whether its parameter Output is equal to flood or all; if the result is negative, then proceed to Step 508, if it is necessary to adjust the state of a Vlan tag, then add ModVlan Action into a new list of Action item, add Output=port into the new list of Action item, and return to Step 503; if the result determined in Step 507 is positive, then proceed to Step 509, determine whether the BufferId of the PacketOut is equal to −1; if the BufferId is equal to −1, then it means that the PacketOut is specified as the data in the signalling, advance to Step 510, obtain all ports of the virtual network switch in a virtual network, and advance to Step 512; if the BufferId is not equal to −1, then it means that the PacketOut instructs that the data packet is a data packet buffered in a physical switch, advance to Step 511, obtain all ports of the virtual network switch in the virtual network other than the data packet input port corresponding to the BufferId, and advance to Step 512; Step 512, for each port, if it is necessary to adjust the Vlan tag, then add ModVlan Action into the new list of Action item, add Output=port into the new list of Action item, and return to Step 503; Step 514, end. For a PacketOut signalling, the Vlan tag needs to be adjusted when the Action field is processed.

The method for adjusting a Vlan tag is:

1. Maintaining a state variable VlanState internally to save the Vlan tag state of the current data packet.

2. Checking whether the BufferId in the PacketOut is equal to −1, if it is −1, then the initial value of VlanState is NoVlan, if it is not −1, then it is necessary to check whether the PacketIn data packet to which the BufferId corresponds carries a Vlan tag, if there is no tag, then VlanState=NoVlan, otherwise VlanState=SliceVlan.

3. If Output=a edge port of a virtual network, then check whether VlanState is NoVlan, if it is NoVlan, then add Output directly into a new list of Action item, if it is SliceVlan, then firstly add ModVlan=NoVlan into an list of Action item, then change VlanState to NoVlan, and add Output into the list of Action item.

4. If Output=an internal port of a virtual network, then check whether VlanState is SliceVlan, if it is SliceVlan, then add Output directly into a new list of Action item, if it is NoVlan, then firstly add ModVlan=SliceVlan into an list of Action item, then change VlanState to SliceVlan, and add Output into the list of Action item.

What are stated above are merely the preferred embodiments of the present invention, and not a limitation in any way of the present invention. Although the present invention has been disclosed above by way of preferred embodiments, it is not to limit the present invention. Any person skilled in the art can, without departing from the scope of the technical solutions of the present invention, make some modifications or changes to the technical content disclosed above and obtain equivalent embodiments. Any simple modifications, equivalent variations and changes made to above embodiments based on the substantive technical content without departing from the content of the technical solutions of the present invention fall in the scope of the technical solutions of the present invention.

What is claimed is:

1. A method for pre-processing downlink signallings of a Software Defined Networking (SDN) virtualization platform based on OpenFlow, comprising:

receiving, by the SDN virtualization platform, a downlink signalling issued by a virtual network controller;

adding a first Match item that matches with a virtual network flow tag into a specific field of the downlink signalling, so that the specific field matches with data packets within a virtual network;

adding the first Match item into a list of Match items; adding a second Match item, which is a Match item that matches with no tag, into the specific field of the downlink signalling, the second Match item matches with data packets that enter the virtual network from edge of the virtual network;

performing a union operation on the second Match item and each flow of virtual network flow rules, and adding a Match item generated as a result of the union operation into the list of Match items;

obtaining the list of Match items;

or, checking whether a list of specific fields contains an indicator for FLOOD operation;

if the list of specific fields does not contain an indicator for FLOOD operation, generating a corresponding field for each Match item in the list of Match items, issuing a flow rule, and ending the pre-processing process;

if the list of specific field contains an indicator for FLOOD operation, it means that FLOOD operation is included;

obtaining all ports of virtual switches in the virtual network, and checking whether there are more ports; if it is determined that there are more ports, obtaining one port; determining whether the port is an edge port of the virtual network;

if it is determined that the port is an edge port of the virtual network, performing a union operation on the port and all Match items without tag in the list of Match items, and adding obtained new Match items into a new list of Match items;

if it is determined that the port is not an edge port of the virtual network, determining further whether the port is an internal port of the virtual network;

if it is determined that the port is not an internal port of the virtual network, returning to the step of checking whether there are more ports;

if it is determined that the port is an internal port of the virtual network, performing a union operation on the port and all Match items with Slice tag in the list of Match items, and adding obtained new Match items into a new list of Match items;

if the result of the step of checking whether there are more ports is negative, generating a corresponding field for each Match item in the list of Match items, issuing a flow rule, and ending the pre-processing process, wherein after performing the above steps, the method further comprises following steps: determining whether there are more Match items in the list of Match items;
if it is determined that there are more Match items, obtaining an item from the list of Match items; otherwise, ending the processing; after obtaining an item from the list of Match items when it is determined that there are more Match items, further determining whether there are more Action items;
if there are no more Action items, combining the new list of Action items with the Match items to generate downlink signalling, issuing the downlink signalling to a physical switch, and returning to determine whether there are more Match items;
if there are more Action items, obtaining the next Action item.

2. The pre-processing method according to claim 1, characterized in that:
said virtual network controller is an OpenFlow controller;
said downlink signalling is FlowMod;
or
said specific field is a Match field in the downlink signalling FlowMod;
said list of Match items is an equivalent list of Match items of the Match field of the downlink signalling FlowMod in the virtual network; said specific field is an Action field;
said Action field belongs to a FlowMod signalling.

3. The processing method according to claim 1, characterized in that:
after the step of obtaining the next Action item, further determining whether type of the Action item is output type;
if the type of the Action item is not output type, adding that Action item into a new list of Action items, and returning to the step of determining whether there are more Action items;
if the type of the Action item is output type, further checking whether parameter of the output type is equal to an indicator for FLOOD operation.

4. The processing method according to claim 3, characterized in that:
if the result of checking whether parameter of the output type is equal to an indicator for FLOOD operation is negative, further performing the following steps:
if state of a flow tag needs to be adjusted, adding a specific Action item into the new list of Action items, adding output type being equal to a port to the new list of Action items, and returning to the step of determining whether there are more Action items;
if the result of checking whether parameter of the output type is equal to an indicator for FLOOD operation is positive, further obtaining all other ports in the virtual network other than input ports in Match items.

5. The processing method according to claim 4, characterized in that:
after the step of obtaining all other ports in the virtual network other than input ports in Match items, further performing the following steps:
for each port, if a flow tag needs to be adjusted, adding the specific Action item into the new list of Action items, adding output type being equal to a port into the new list of Action items, and returning to the step of determining whether there are more Action items.

6. The processing method according to claim 1, characterized in that:
said downlink signalling is a FlowMod signalling;
said specific Action item is a ModVlan Action item.

7. The processing method according to claim 1, further comprising the following steps:
obtaining a specific field of the downlink signalling;
determining whether there are more Action items;
if there are no more Action item, issuing the downlink signalling, and ending the processing;
if there are more Action items, obtaining the next Action item.

8. The processing method according to claim 7, characterized in that:
after the step of obtaining the next Action item, further performing the following steps:
determining whether type of the Action item is output;
if the type of the Action item is not output, adding that Action item into an list of Action items, and returning to the step of determining whether there are more Action items;
if the type of the Action item is output, further checking whether that Action item contains an indicator for FLOOD operation;
if the result of checking whether the Action item contains an indicator for FLOOD operation is negative, and if state of a flow tag needs to be adjusted, adding a specific Action item into a new list of Action item, adding output type being equal to a port to the new list of Action item, and returning to the step of determining whether there are more Action items;
if the result of checking whether the Action item contains an indicator for FLOOD operation is positive, determining whether BufferID of the downlink signalling is equal to −1;
if the BufferID is equal to −1, obtaining all ports of the virtual network switch in a virtual network; for each port, if the state of the flow tag needs to be adjusted, adding the specific Action item into a new list of Action items, adding output type being equal to a port to the new list of Action items, and returning to the step of determining whether there are more Action items;
if the BufferID is not equal to −1, obtaining all ports of the virtual network switch in the virtual network other than input port of data packet to which the BufferID corresponds; for each port, if the state of the flow tag needs to be adjusted, adding the specific Action item into a new list of Action items, adding output type being equal to a port to the new list of Action items, and returning to the step of determining whether there are more Action items.

9. The processing method according to claims 8, characterized in that:
said downlink signalling is a PacketOut signalling;
said specific Action item is a ModVlan Action item.

10. The processing method according to claim 1, characterized in that:
said virtual network controller is an OpenFlow controller;
said downlink signalling is FlowMod;
or
said specific field is a Match field in the downlink signalling FlowMod;
said list of Match items is an equivalent list of Match items of the Match field of the downlink signalling FlowMod in the virtual network; said specific field is an Action field;
said Action field belongs to a FlowMod signalling.

11. The processing method according to claim 3, characterized in that:
said downlink signalling is a FlowMod signalling;
said specific Action item is a ModVlan Action item.

12. The processing method according to claim 4, characterized in that:
   said downlink signalling is a FlowMod signalling;
   said specific Action item is a ModVlan Action item.

13. The processing method according to claim 5, characterized in that:
   said downlink signalling is a FlowMod signalling;
   said specific Action item is a ModVlan Action item.

14. The processing method according to claim 7, characterized in that:
   said virtual network controller is an OpenFlow controller;
   said downlink signalling is FlowMod;
   or
   said specific field is a Match field in the downlink signalling FlowMod;
   said list of Match items is an equivalent list of Match items of the Match field of the downlink signalling FlowMod in the virtual network; said specific field is an Action field;
   said Action field belongs to a FlowMod signalling.

\* \* \* \* \*